Figure 1:
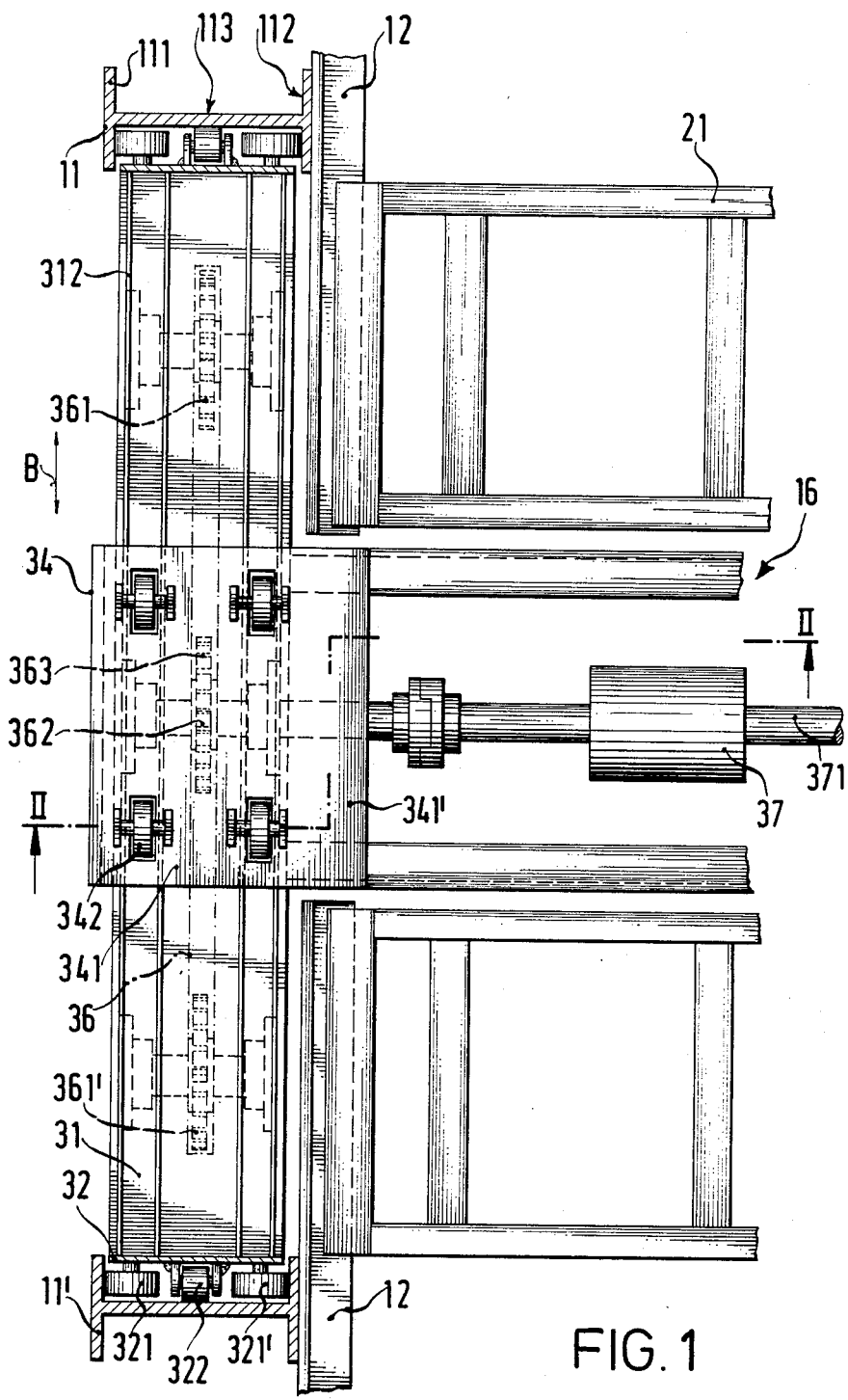

United States Patent [19]

Theobald

[11] Patent Number: 4,572,719
[45] Date of Patent: Feb. 25, 1986

[54] DEVICE FOR STORING PALLETS AND REMOVING THEM FROM STORAGE

[76] Inventor: Adolf Theobald, Merchstrasse 5, D-5758 Fröndenberg-Warmen, Fed. Rep. of Germany

[21] Appl. No.: 550,645

[22] Filed: Oct. 6, 1983

[30] Foreign Application Priority Data

Feb. 18, 1982 [DE] Fed. Rep. of Germany ....... 3205765

[51] Int. Cl.$^4$ .......................... B65G 1/04; B66F 9/07
[52] U.S. Cl. ...................................... 414/277; 414/286
[58] Field of Search ............... 414/267, 277, 280–282, 414/458, 459, 662, 663, 286; 211/187, 190, 208; 198/345

[56] References Cited

U.S. PATENT DOCUMENTS

| | | | |
|---|---|---|---|
| 3,768,676 | 10/1973 | Spitzer | 414/459 |
| 3,809,259 | 5/1974 | Pipes | 414/281 X |
| 3,954,185 | 5/1976 | Wentz | 414/286 |
| 3,993,202 | 11/1976 | Neitzel | 414/282 |
| 4,252,486 | 2/1981 | Soligno | 414/277 X |
| 4,331,229 | 5/1982 | Kamm | 198/345 |

FOREIGN PATENT DOCUMENTS

| | | |
|---|---|---|
| 1177553 | 9/1964 | Fed. Rep. of Germany . |
| 2324907 | 4/1973 | Fed. Rep. of Germany . |
| 2400871 | 7/1974 | Fed. Rep. of Germany . |
| 2725789 | 12/1978 | Fed. Rep. of Germany . |
| 2911051 | 9/1980 | Fed. Rep. of Germany ...... 414/281 |
| 3032050 | 4/1982 | Fed. Rep. of Germany . |

Primary Examiner—Joseph E. Valenza
Assistant Examiner—David A. Bucci
Attorney, Agent, or Firm—Max Fogiel

[57] ABSTRACT

An installation for storing self-supporting pallets and removing the pallets from storage, in which a rack shelf arrangement is provided with rows of columns spaced apart and arranged in opposite pairs with respect to columns of an adjacent row. Each pair of columns carries cantilever-mounted brackets arranged also in opposite pairs. Each pair of brackets defines a shelf for supporting a pallet on two opposite edges of the pallet. A lifting and displacement device lifts a pallet in a passageway between shelves, to a location that is higher than a storage level defined by a pair of the brackets, for the purpose of storing and displacing the pallet. The lifting and displacment device has bridges that extend between columns of two successive shelves. Each bridge has a carriage that is synchronously displaceable transversely to the shelves. The carriage has a platform projecting into the storage area. A protuberant portion on the platform supports a lower one of two shoulders that are spaced one above the other on opposite edges of the pallet.

9 Claims, 2 Drawing Figures

DEVICE FOR STORING PALLETS AND REMOVING THEM FROM STORAGE

The invention concerns a device for storing pallets and removing them from storage that has, first, a number of shelves erected along lanes and consisting of beams on the front and of brackets positioned at intervals one in front of the other and one above the other that engage the bottom of shoulders on the front of the self-supporting pallets that are to be stored and, second, a lifting-and-displacement mechanism that accepts each pallet at the front, travels along a shelf and lifts and displaces the pallet in a lane and stores and removes the pallet.

The utilization of space is of considerable economic significance in storage devices, especially stacked-shelf devices, in which a number of pallets are stored one above another in the shelving. Known devices for storing pallets and removing them from storage actually take up an undesirable amount of space within the shelving at the expense of storage capacity. The lifting-and-displacement mechanism between each pair of shelves in such devices consists of pivoting arms (German AS No. 1 177 553 & German Pat. No. 2 725 789) or of telescoping parts (German OS No. 2 400 871 and German OS No. 2 725 789) that can be moved into the shelving and that underpin the pallet itself. Such a mechanism requires free space for the device for storing pallets and removing them from storage. This space is in addition to the dead space already in existence between the vertically positioned shelving compartments that derives from the path needed to deposit and lift the pallets and includes a margin of safety. Still another component of the lifting-and-displacement mechanism is the carriage that underpins either the pallet or extensions on the front of the pallet. These carriages travel into the shelving along tracks below and projecting beyond the shelf brackets that underpin the pallets (German OS No. 2 324 907). This version of the storage device, which employs standard pallets, also necessitates a free space between the shelving compartments for the pallet-transport carriages. Another embodiment (German OS No. 3 032 050) employs pallets that terminate at a distance from the tracks and have extensions or supports projecting over them. This decreases the amount of space necessary for the device for storing the pallets and removing them from storage to the path traveled by the pallet-transport carriage. The interval between the shelving compartments can accordingly be reduced to the path needed to deposit and lift the pallets, including the margin of safety. Nevertheless, this version still incorporates areas of shelving containing the path traveled by the transport carriage, at the cost of storage capacity. All known devices for storing pallets and removing them from storage are also comparatively difficult to access. This makes them difficult to repair.

The present invention employs the state of the art outlined in the foregoing as a point of departure. The invention is primarily intended to optimize the storage capacity of a device for storing self-supporting pallets in the shelves that are an essential component of the device.

This object is attained in accordance with the invention in a device for storing pallets and removing them from storage that has, first, a number of shelves erected along lanes and consisting of beams on the front and of brackets positioned at intervals one in front of the other and one above the other that engage the bottom of shoulders on the front of the self-supporting pallets that are to be stored and, second, a lifting-and-displacement mechanism that accepts each pallet at the front, travels along a shelf and lifts and displaces the pallet in a lane and stores and removes the pallet in that the device consists of two matching bridges that can be synchronically lifted, each of which leads along a single bracket on the rear of the shelves, which are in the form of extensions and of carriages that can be displaced along the bridges at an angle to the shelves and have a platform that extends out into the storage device, with the projecting length of the platform underpinning the lower of two shoulders positioned at intervals one above the other on the front of the pallets.

The device for storing pallets and removing them from storage is positioned in the range of brackets of a sequence of shelves in accordance with the invention. The actual shelving area, even the path needed to deposit and lift the pallets and including a margin of safety, remains almost completely available for storage. The interval between shelving compartments or between the brackets that underpin the stored pallets and make up the compartments is accordingly very small. Another advantage of the device in accordance with the invention is that it is easily accessible, as are the carriages that are an essential component of it and travel into the shelving. This considerably facilitates repairs.

It is practical for the shoulders on the front of the pallets to consist of the flanks of the U-shaped sections of steel that constitute the front wall of a pallet.

The device is preferably lifted and displaced with hoists positioned above the brackets and synchronically engaging the fronts of the bridges that are an essential component of the mechanism that lifts and displaces the pallets. The carriages that are an essential component of the mechanism that lifts and displaces the pallet and that travel into the storage device have a central drive mechanism to ensure ganging.

It is practical for the bridges that are an essential component of the mechanism that lifts and displaces the pallets to consist of box girders that accept the drive mechanism or transmission for the carriages that store and remove the pallets.

One embodiment has slides on the front of the bridges that are an essential component of the mechanism that lifts and displaces the pallets to guide the bridges and these slides travel on guide rollers against the flanges and web of the U or H sections that make up the shelving brackets.

Another embodiment has support rollers associated with the carriages that underpin the pallets and resting on a guide on the bottom of the bridges that constitute the track for the carriages to accept the overturning moment that derives from the pallet as it rests on the storage device, specifically on the carriages that are an essential component of the lifting-and-displacement mechanism.

The shoulders that constitute a support for the projecting length of the carriage platform can have stops at the front of the pallets and surrounding the offset projecting length of the carriage platform and the projecting length of the carriage platform that underpins the bottom of the shoulders on the pallets can have centering cams with surfaces that slope toward the pallets. This contributes to correct positioning of the pallets with respect to the storing device.

Figure 2:
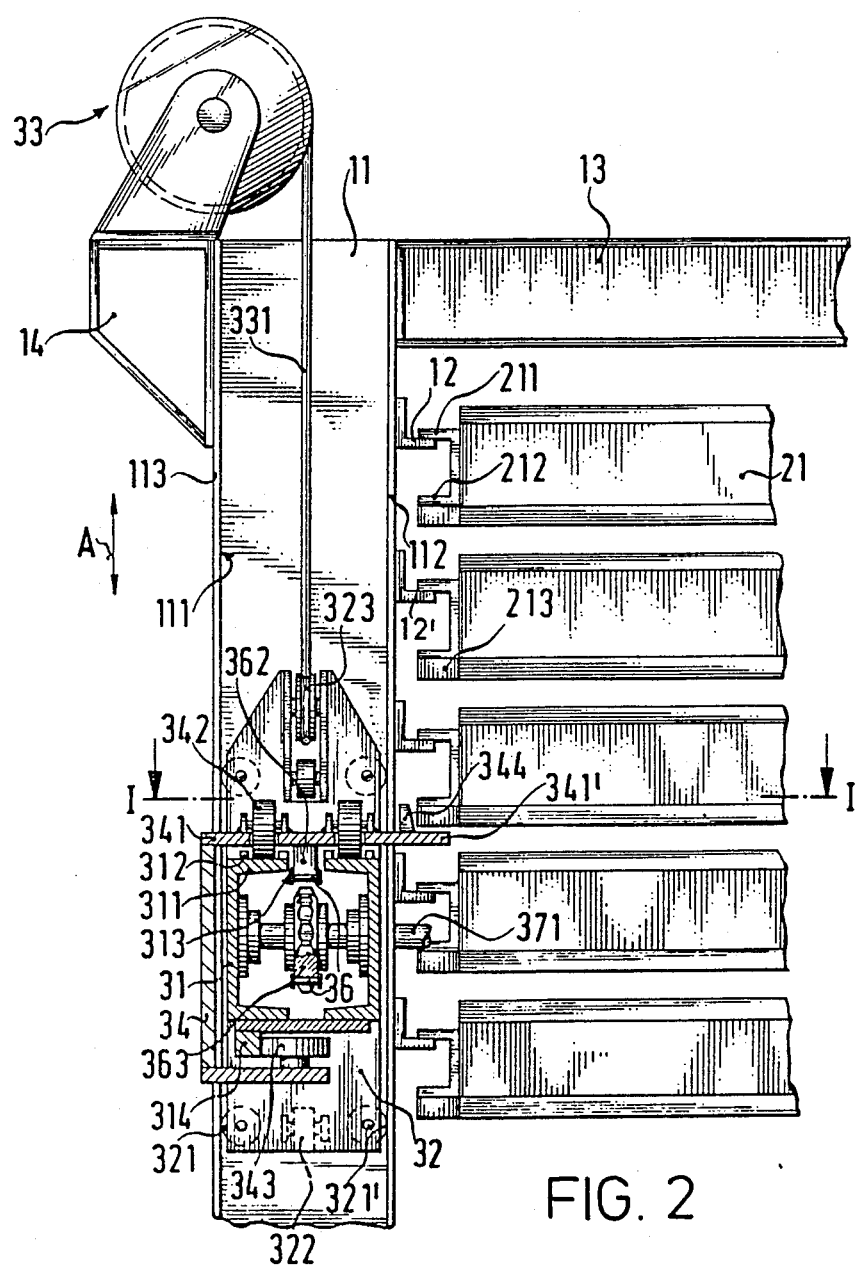

One embodiment of the invention is schematically illustrated in the drawings, in which FIG. 1 is a truncated section along Line I—I in FIG. 2 through a shelving system in accordance with the invention and FIG. 2 is a section along Line II—II in FIG. 1.

The storage device illustrated in the drawings consists of vertically stacked extension shelves with lanes 16 left between them. The shelves consist of beams 11, 11' and of depositing brackets 12, 12' positioned at intervals one above the other and extending along each side of the beams. The brackets are for pallets 21. Beams 11, 11' are united overhead by a yoke 13. Each pallet 21 has shoulders 211 and 212 positioned at intervals and one above the other along the front. The upper shoulder 211 rests on brackets 12, 12' when a pallet 21 is deposited in the shelving.

Shelving beams 11, 11' are H beams. Their flanges 111 and 112 function as guides for slides 32 mounted on the front sides of a box beam 31 that extends between the beams 11, 11' of a series of shelves. Slides 32 and 32' are supported by guide rollers 321, 321' and 322 against the flanges 111 and 112 and the web 113 of beams 11 and 11'. Slides 32 and 32' can be displaced vertically in the direction indicated by arrow A in FIG. 2 with synchronized electric hoists 33 that engage hoisting cables 331 leading over pulleys 323 to slides 32 and 32'. Hoists 33, and hence also the box beam 31 that extends between slides 32 and 32', are mounted above the shelves on brackets 14 mounted on beams 11 and 11'. This of course ensures the synchronized ganging of all the electric hoists 33, even those on the other front side of shelves 11 or 12, 12' and 11' or 12, 12'.

A carriage 34 that rests on box beam 31 can be displaced along it on wheels 342 held in place by rails 312 in the direction indicated by double-headed arrow B. A reversible chain drive 36 is accommodated in box beam 31 and runs over pulleys 361 and 361' in it. Chain drive 36 engages carriage 34 by means of a cam 362 through a longitudinal slot 313 in the running surface 311 of box beam 31. Chain drive 36 is itself powered by a shaft 371 that derives from a drive mechanism common to the chain drives 36 on each side and transmits power to a pinion 363.

The platform 341 of carriage 34 projects to a limited extent over beams 11 and 11' into the shelving. The projecting length 341' of platform 341 underpins the lower 212 of the shoulders 211 and 212 on the front of each pallet 21. The overturning moment that derives from pallet 21 as it rests on the projecting length 341' of platform 34 is accepted by support rollers 343 that are associated with carriage 34 and rest on a guide 314 on the bottom of box beam 31.

A centering cam 344 with a centering surface that slopes toward the shelving is mounted on the projecting length 341' of platform 341. Centering stops 213 are mounted in front of the head of the lower shoulders 212 of pallets 21 around projecting length 341'. Cam 344 and stops 213 help to correctly position the pallets with respect to the storing device.

A pallet 21 that is to be stored is transported with, say, a truck into lane 16. It is then lifted with the device for storing pallets and removing them from storage, the shoulders 212 of pallet 21 underpinned by the projecting length 341' of the platform 341 of the carriage 34 that is an essential component of the device, to the level of the shelving compartment in which the pallet is to be stored. The first level to be selected is the one that allows the depositing brackets 12, 12' of the shelf to be transferred with the depositing shoulders 211 of pallet 21. The device is then (after transfer of the pallet into the shelf) lowered until pallet shoulders 211 come to rest on shelving brackets 12, 12' and carriage 34 is free of pallet 21. Carriage 34 can then be returned to its initial position and the device will be ready for further operations, meaning the storage and removal from storage of other pallets. The pallets are removed from storage by a similar operation.

The invention obviously leads to almost complete utilization of the shelving area, specifically of the area between shelving beams 11, 11', the floor, and the yoke 13 that unites beams 11, 11', for storing pallets while reducing dead space to a minimum.

I claim:

1. Apparatus for storing self-supporting pallets and removing the pallets from storage, comprising: a rack shelf arrangement having rows of columns spaced apart and arranged in opposite pairs with respect to columns of an adjacent row; each pair of columns carrying cantilever mounted brackets arranged also in opposite pairs, each pair of brackets defining a shelf for supporting a pallet on two opposite edges of the pallet; said shelves having passageways therebetween; lifting and displacement means for lifting a pallet in a passageway higher than a storage level defined by a pair of said brackets to store and displace the pallet; said lifting and displacement means having two corresponding synchronously vertically displaceable bridges, each bridge extending between columns of two successive shelves; carriage means on each bridge which are synchronously displaceable transversely to the shelves; said carriers means having a platform projecting into a storage area; two shoulders spaced one above the other on said opposite edges of the pallet; a protuberant portion on said platform for supporting the lower one of said shoulders; the upper one of said shoulders being supported by a shelf when a pallet is placed in a shelf.

2. Apparatus as defined in claim 1, wherein said shoulders are formed from arms of U-shaped steel sections forming end walls of the pallets.

3. Apparatus as defined in claim 1, including hoists operated in synchronism and disposed above said columns, said hoists engaging ends of said bridges.

4. Apparatus as defined in claim 1, including central drive means for said carriage means.

5. Apparatus as defined in claim 4, wherein said bridges are formed from box-girder supports receiving said drive means for said carriage means.

6. Apparatus as defined in claim 1, including slide members guided in columns by guide rollers and being supported on flanges and cross-webs of said columns, said columns being formed from I-shaped steel sections, said slide members being located at opposite ends of said bridges and protruding upwardly and downwardly beyond the bridges.

7. Apparatus as defined in claim 1, wherein said platform has support rollers which oppose a tilting moment applied to the platform by a pallet when supported thereon, said rollers being supported on guide means on a base of each of said bridges, said guide means forming a track for said carriage means.

8. Apparatus as defined in claim 1, including centering cams for centering the pallets; said shoulders having centering stop members engaging against said centering cams, said centering cams being on said protuberant portions of the platform, said centering cams having a downwardly inclined surface facing the pallet and sloping downwardly to said protuberant portion of the platform.

9. Apparatus for storing self-supporting pallets and removing the pallets from storage, comprising: a rack shelf arrangement having rows of columns spaced apart and arranged in opposite pairs with respect to columns of an adjacent row; each pair of columns carrying cantilever mounted brackets arranged also in opposite pairs, each pair of brackets defining a shelf for supporting a pallet on two opposite edges of the pallet; said shelves having passageways therebetween; lifting and displacement means for lifting a pallet in a passageway higher than a storage level, defined by a pair of said brackets, to store and displace the pallet; said lifting and displacement means having two corresponding synchronously vertically displaceable bridges, each bridge extending between columns of two successive shelves; carriage means on each bridge which are synchronously displaceable transversely to the shelves; said carriage means having a platform projecting into a storage area; two shoulders spaced one above the other on said opposite edges of the pallet; a protuberant portion on said platform for supporting the lower one of said shoulders; the upper one of said shoulders being supported by a shelf when a pallet is placed on a shelf; said shoulders being formed from arms of U-shaped steel sections forming end walls of the pallets; hoists operated in synchronism and disposed above said columns, said hoists engaging ends of said bridges; central drive means for said carriage means; said bridges formed from box-girder supports receiving said drive means for said carriage means; slide members guided in columns by guide rollers and supported on flanges and cross-webs of said columns, said columns being formed from I-shaped steel sections, said slide members being located at opposite ends of said bridges and protruding upwardly and downwardly beyond the bridges; said platform having support rollers which oppose a tilting moment applied to the platform by a pallet when supported thereon, said rollers being supported on guide means on a base of each of said bridges, said guide means forming a track for said carriage means; centering cams for centering the pallets; said shoulders having centering stop members engaging against said centering cams, said centering cams being on said protuberant portions of the platform, said centering cams having a downwardly inclined surface facing the pallet and sloping downwardly to said protuberant portion of the platform.

* * * * *